US008918249B2

(12) United States Patent
Utter et al.

(10) Patent No.: US 8,918,249 B2
(45) Date of Patent: Dec. 23, 2014

(54) DUAL FUNCTION ELECTRONIC CONTROL UNIT

(71) Applicant: GM Global Technology Operations LLC, Detroit, MI (US)

(72) Inventors: Thomas E. Utter, Royal Oak, MI (US); David T. Proefke, Troy, MI (US); Kimberly A. Morse-Harvey, Warren, MI (US); Craig Atiyeh, Grand Blanc, MI (US); Aaron P. Creguer, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/837,713

(22) Filed: Mar. 15, 2013

(65) Prior Publication Data

US 2014/0277938 A1 Sep. 18, 2014

(51) Int. Cl.
*G06F 7/00* (2006.01)
*E05B 77/14* (2014.01)

(52) U.S. Cl.
CPC .................................... *E05B 77/14* (2013.01)
USPC ........................................................ 701/36

(58) Field of Classification Search
USPC ........................................................ 701/36
See application file for complete search history.

(56) References Cited

U.S. PATENT DOCUMENTS

| | | | | |
|---|---|---|---|---|
| 7,070,018 | B2 * | 7/2006 | Kachouh | 180/287 |
| 7,086,257 | B2 * | 8/2006 | Bucker et al. | 70/256 |
| 8,022,808 | B2 * | 9/2011 | Kurpinski et al. | 340/5.61 |
| 2004/0050121 | A1 * | 3/2004 | Bucker et al. | 70/237 |
| 2004/0251710 | A1 * | 12/2004 | Kachouh | 296/146.1 |
| 2009/0085720 | A1 * | 4/2009 | Kurpinski et al. | 340/5.64 |

* cited by examiner

*Primary Examiner* — Mary Cheung
*Assistant Examiner* — Anne Mazzara
(74) *Attorney, Agent, or Firm* — Ingrassia Fisher & Lorenz, P.C.

(57) ABSTRACT

Methods and apparatus are provided for an electronic control unit that can be adjusted or changed to operate in different manners for different circumstances. The apparatus includes an electronic control unit (ECU) for operation of a plurality of electronic components, such as latch motors. In one embodiment, the apparatus comprises a plurality of inputs configured to receive a connection from a plurality of handle sensors, and a plurality of outputs configured to connect to the plurality of latch motors. The ECU also comprises a conversion loop with a receptacle and a receptacle circuit. The receptacle circuit can be configured as either an open or closed circuit, and the receptacle circuit is accessible via the receptacle. The ECU is configured to operate in either a first mode or a second mode depending on whether the receptacle circuit is open or closed.

21 Claims, 4 Drawing Sheets

DUAL FUNCTION ELECTRONIC CONTROL UNIT

TECHNICAL FIELD

The technical field generally relates to electronic control units used to control electronic devices, and more particularly relates to electronic control units to control the operation of electric motors for vehicle doors.

BACKGROUND

Modern vehicles have many electronic devices with a wide variety of functions and purposes that improve the safety and convenience of the vehicle. Many of these electronic devices have an electronic control unit that serves as the "brain" to determine when, how, or to what degree to engage the device. Typically, the logic to control a particular electronic component is built into the electronic control unit, so the electronic control unit is customized for a particular use and application.

The electronic control unit often includes an integrated circuit and associated wiring and electronics that are designed for the particular use. Some electronic control units can be programmed, similar to a computer, but others are hard wired or structurally designed for a specific purpose. Often, an electronic control unit will include both hard wired components and programmed instructions. An electronic control unit that can be re-programmed may be more flexible in use, but may also be less reliable. Electrical overloads, sudden magnetic field changes, or other actions can impact sensitive electronic components. Any action that impacts or modifies the programming can render the electronic control unit inoperative. In other cases, the electronic control unit could change its mode of operation from the designed mode, and the result could be unsafe. For example, an electronic control unit that is designed to electrically unlatch a vehicle door may have built in safety interlocks that prevent unlatching the door when the vehicle is moving or in gear. An unintended change in the programming could result in the door unlatching and possibly opening while driving down the road at high speeds, which is an unsafe situation. For this reason, some electronic control units include hard wired or structural components such that they can only operate in one way, and that is the designed way. No change in the programming can overcome a hard wired or structural interlock.

It is not economically practical to modify a hard wired electronic control unit to work in a different manner than the original design. In many instances, it is less expensive to produce a new unit with the desired logic than to modify the operations of an existing, different electronic control unit. Also, many electronic control units are not built for disassembly and maintenance, so repair or change is not practical. Therefore, manufacturers will maintain an inventory or each type of electronic control unit needed for production.

Many vehicle manufacturers will include several different electronic control units in a single vehicle, with each different electronic control unit operating different components. A vehicle manufacturer will often produce many different models of vehicles, so several different types of electronic control units are maintained in inventory. This also requires several different types of electronic control units that should be maintained in inventory for repairs or replacements. There is an additional cost for each different part that must be maintained in inventory, so reducing the number of different parts reduces the total cost.

Therefore, there is a need to develop interchangeable parts that can serve more than one function. For electronic control units which are hard wired, there is a need to be able to change the control logic in a desired and predictable manner so that a single part can be used for more than one purpose. The method of changing the logic should be simple, reproducible, and effective. Accordingly, it is desirable to develop an electronic control unit with different modes of operation. In addition, it is desirable for the method and structure of changing the modes of operation to be simple and easy to verify. Furthermore, other desirable features and characteristics of the present invention will become apparent from the subsequent detailed description and the appended claims, taken in conjunction with the accompanying drawings and the foregoing technical field and background.

SUMMARY

An electronic control unit (ECU) is provided for operation of a plurality of latch motors. In one embodiment, the apparatus comprises a plurality of inputs configured to receive a connection from a plurality of handle sensors, and a plurality of outputs configured to connect to the plurality of latch motors. The ECU also comprises a conversion loop with a receptacle and a receptacle circuit. The receptacle circuit can be configured as either an open or closed circuit, and the receptacle circuit is accessible via the receptacle. The ECU is configured to operate in either a first mode or a second mode depending on whether the receptacle circuit is open or closed.

Alternatively, a motor vehicle comprises a plurality of selected doors with handle sensors. A latch motor is associated with each selected door, and the latch motor drives one of either a lock or an unlatching mechanism. An ECU is connected to the latch motor, and the ECU comprises a conversion loop that switches between a first and second mode. The conversion loop comprises a receptacle circuit that is accessible via a receptacle, and the receptacle circuit can be set as either an open or closed circuit. Switching the receptacle circuit between an open and closed circuit changes the conversion loop between the first and second modes.

In yet another embodiment, a method is provided for modifying an electronic control unit to operate vehicle latch motors in different manners, as desired for different motor vehicle configurations. In one embodiment, the method comprises providing a vehicle with a plurality of selected doors, where each selected door has a latch motor and a handle sensor. The ECU has outputs for connection to the latch motors, and the ECU also has a conversion loop with a receptacle circuit that can be modified between an open and closed circuit. The receptacle circuit is accessible via a receptacle, and the conversion loop operates in different modes depending on whether the receptacle circuit is open or closed. The user determines the desired mode of operation, and sets the receptacle circuit to match such that the ECU operates as desired for different uses. The ECU is installed in the vehicle for proper operations.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
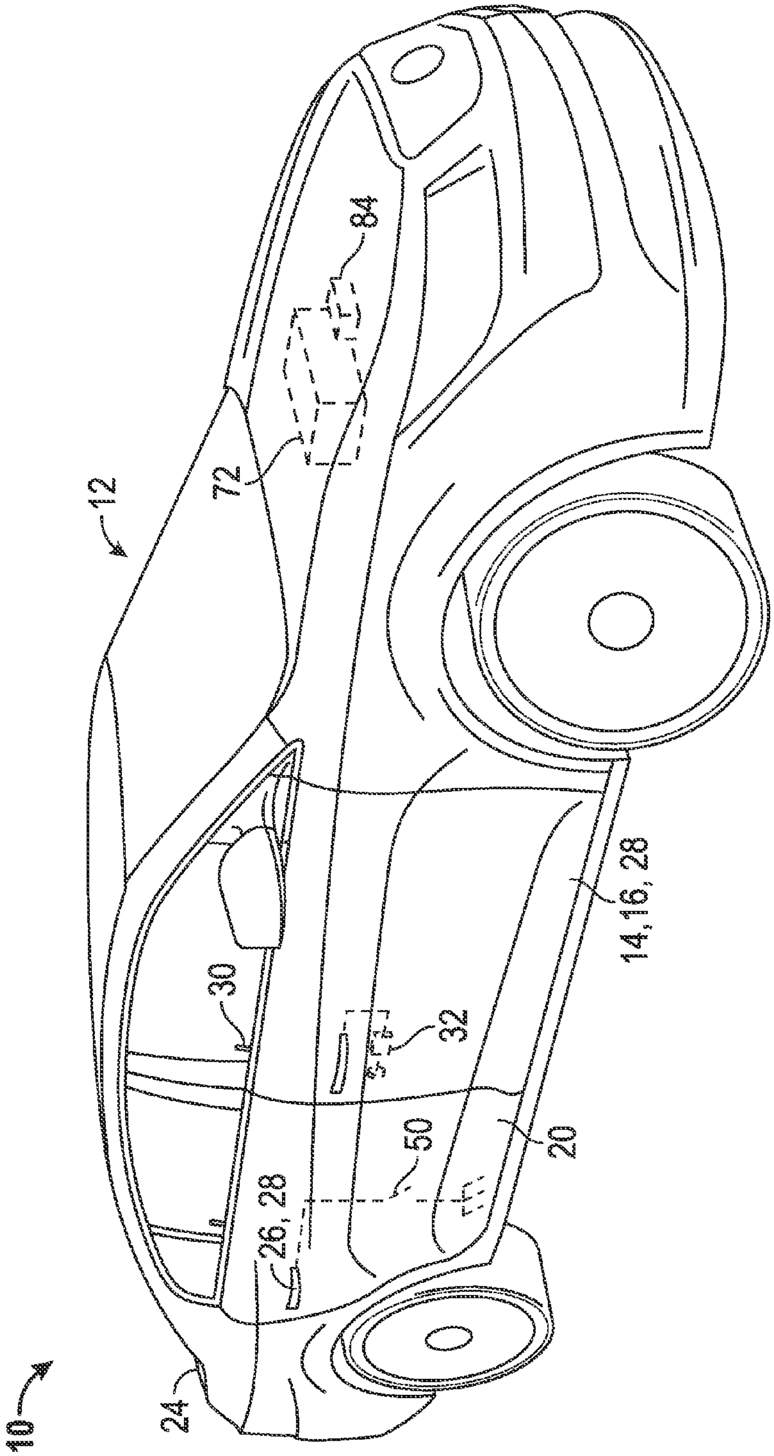
FIG. 1 is a side perspective view of a motor vehicle having an electronic control unit associated with an automatic door latch mechanism in accordance with various exemplary embodiments.
Figure 2:
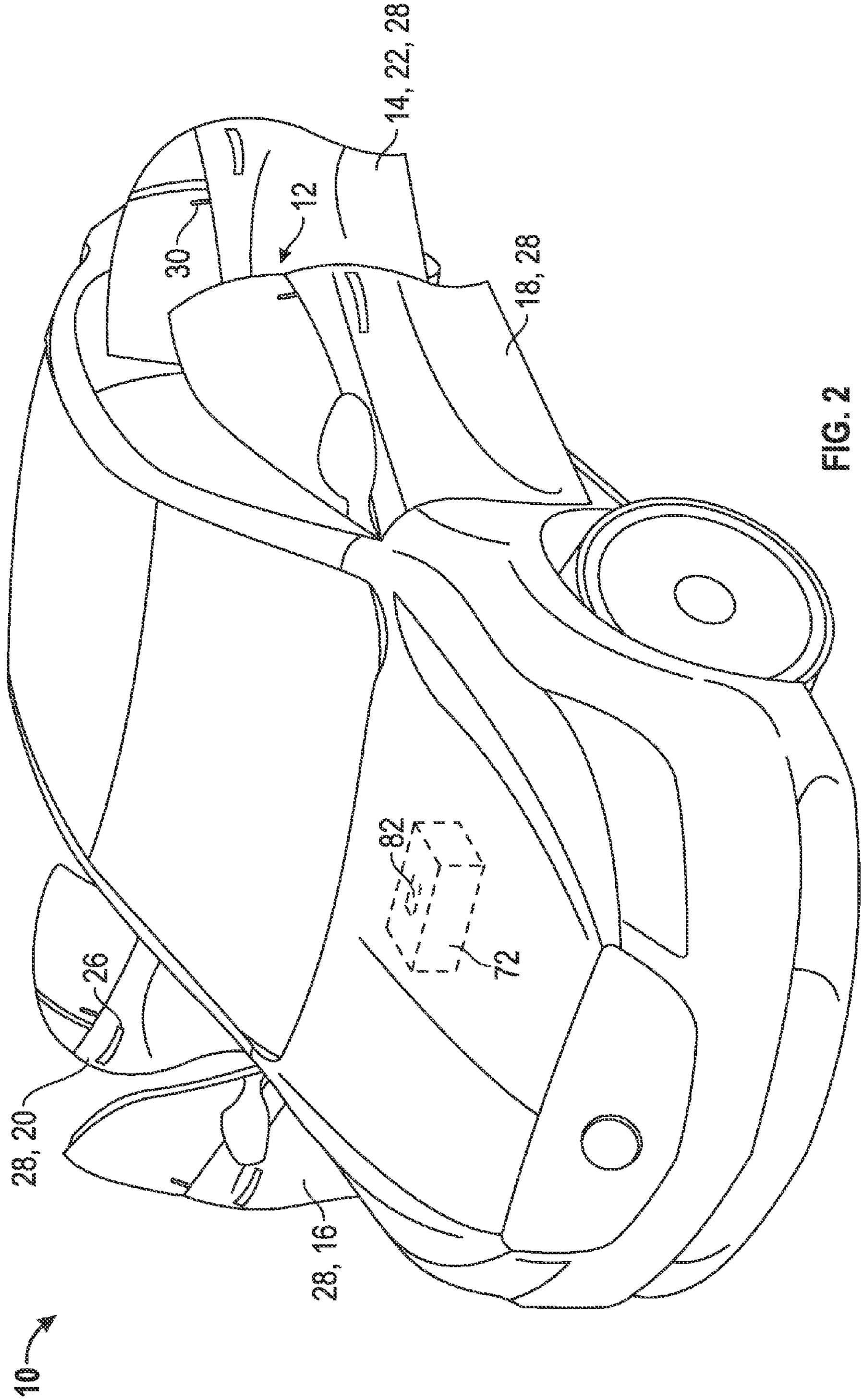
FIG. 2 is a front upper perspective view of the motor vehicle of FIG. 1 with the doors open in accordance with various embodiments.

Referring now to FIGS. 1 and 2, a vehicle 10 is shown to include an electronic control unit in accordance with various embodiments. Although the figures shown herein depict an example with certain arrangements of elements, additional intervening elements, devices, features, or components may be present in an actual embodiment. It should also be understood that the FIGS are merely illustrative and may not be drawn to scale. As can be appreciated, the ECU of the present disclosure can be implemented in various systems and is not limited to the present vehicle example.

In various embodiments, the vehicle 10 includes an engine for power, a cab 12 for passengers, and doors 14 for access to the cab 12. There are several different styles or designs, but in some embodiments there are four doors 14 that provide access to the cab. The doors 14 comprise the front right door 16, the front left door 18, the back right door 20, and the back left door 22. However, in other embodiments, there may only be two doors 14 providing access to the cab 12, or there may be a hatch on the back, and it is even possible to have more than four doors 14. The trunk 24 can also be considered a door 14 that provides access to a storage compartment. Each door 14 includes door handles 26, and the door handles 26 can be coupled to one or more handle sensors 50 such that the handle sensors 50 are activated by operating the door handles 26. The handle sensors 50 can be electrical switches that are actuated when a door handle 26 is used, but the handle sensors 50 can also be a capacitive or optical sensor which can detect the presence of a hand, or other sensors that can indicate a person is pressing, pulling, squeezing, or otherwise activating the door handle 26.

Some of the doors 14 may comprise electronic components, and others may not. Selected doors 28 are those doors 14 that comprise electronic components that are controlled and operated with predetermined logic. More particularly, the selected doors 28 are those doors 14 that are controlled by the ECU described more fully below. A single ECU that can control a plurality of different types of operations can be used in several different ways, both for motor vehicles 10 and for other uses. One exemplary embodiment is a single ECU used to control either automatic door locks 30, or automatic door latches 32, where a door latch 32 is a drive mechanism to electrically latch or unlatch a door 14.

Automatic door latches 32 often incorporate a locking function, so the logic to operate automatic door latches 32 is similar to the logic for automatic door locks 30. However, in some embodiments, the automatic door latches 32 are not allowed to operate unless a handle sensor 50 is activated in contrast with door locks 30 which are allowed to operate without activation of a handle sensor 50. A door 14 that is merely unlocked is still secured in a closed position by the latch. The device controlling the operation of the automatic latch 32 should be hard wired, or structurally built, to prevent operation without activation of the door handle 26. A hard wired controller prevents a programming change, error, or other failure from accidentally unlatching a door 14 without a person activating the door handle sensor 50. In some embodiments, the door latch 32 can also be activated by other switches or sensors controlled by a person, such as a button on the driver's door 14 that controls latching for all the doors 14. The main point is that the latch 32 should not be able to operate without a human action that causes a sensor signal to activate.

Figure 3:
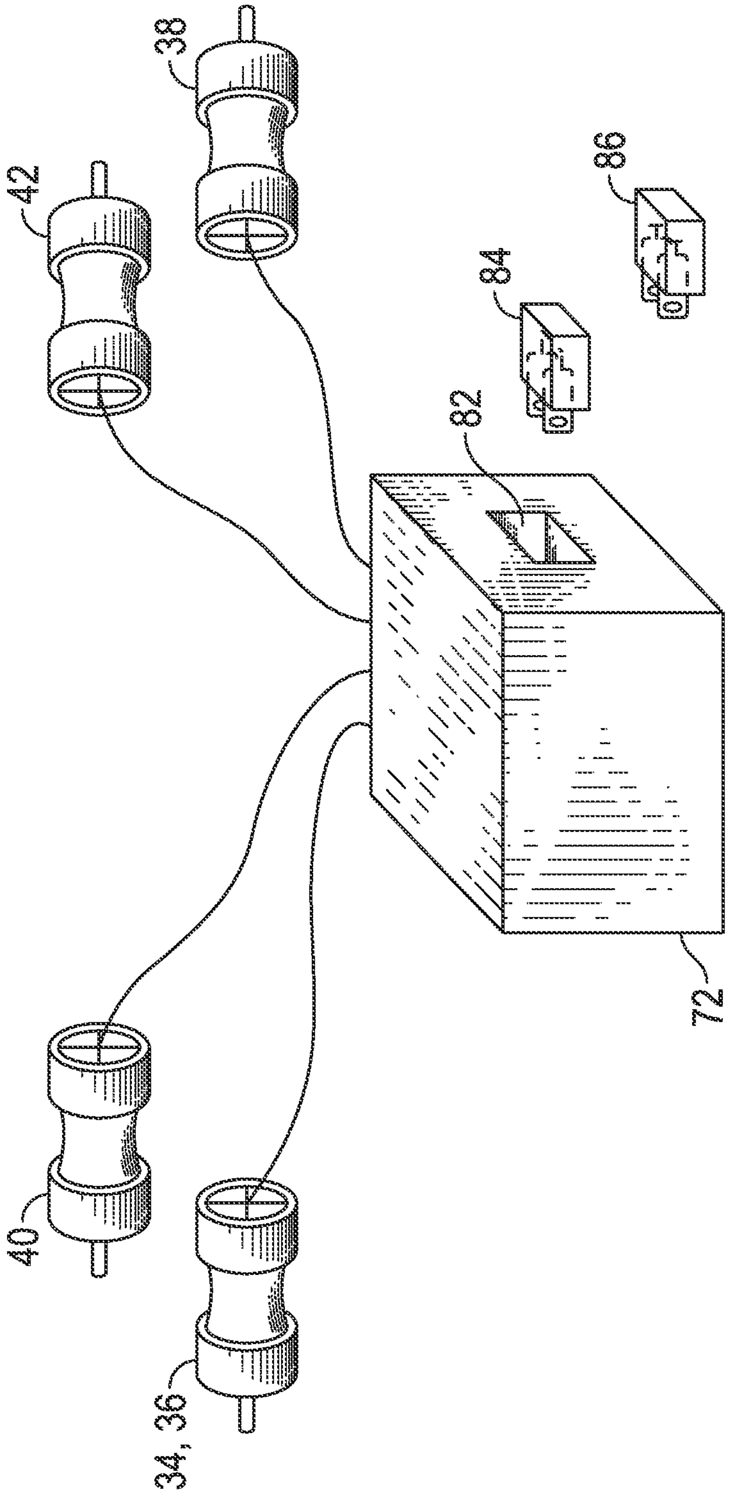
FIG. 3 is an exemplary diagram of the electronic control unit connected to a plurality of latch motors of the door in accordance with various embodiments.

With reference now to FIG. 3 and with continued reference to FIGS. 1 and 2, a latch motor 34 is used to operate either the automatic door lock 30 or the automatic door latch 32. The latch motor 34 can be electrically powered, and typically uses direct current (DC), although alternating current (AC) embodiments are possible. An electric motor that uses DC can be reversed by reversing the polarity of the power, so the same latch motor 34 can be driven forwards and backwards. Therefore, a single latch motor 34 can drive the forward and backward motion of locking and unlocking a vehicle door 14, or latching and unlatching a vehicle door 14. A different latch motor 34 is typically used for each different door 14, so if the vehicle 10 has four doors 14, there would be a right front latch motor 36, a left front latch motor 38, a right rear latch motor 40, and a left rear latch motor 42. In an alternate embodiment, one latch motor 34 could be used for locking/latching the door 14, and a second latch motor 34 could be used for unlocking/unlatching the door 14.

Figure 4:
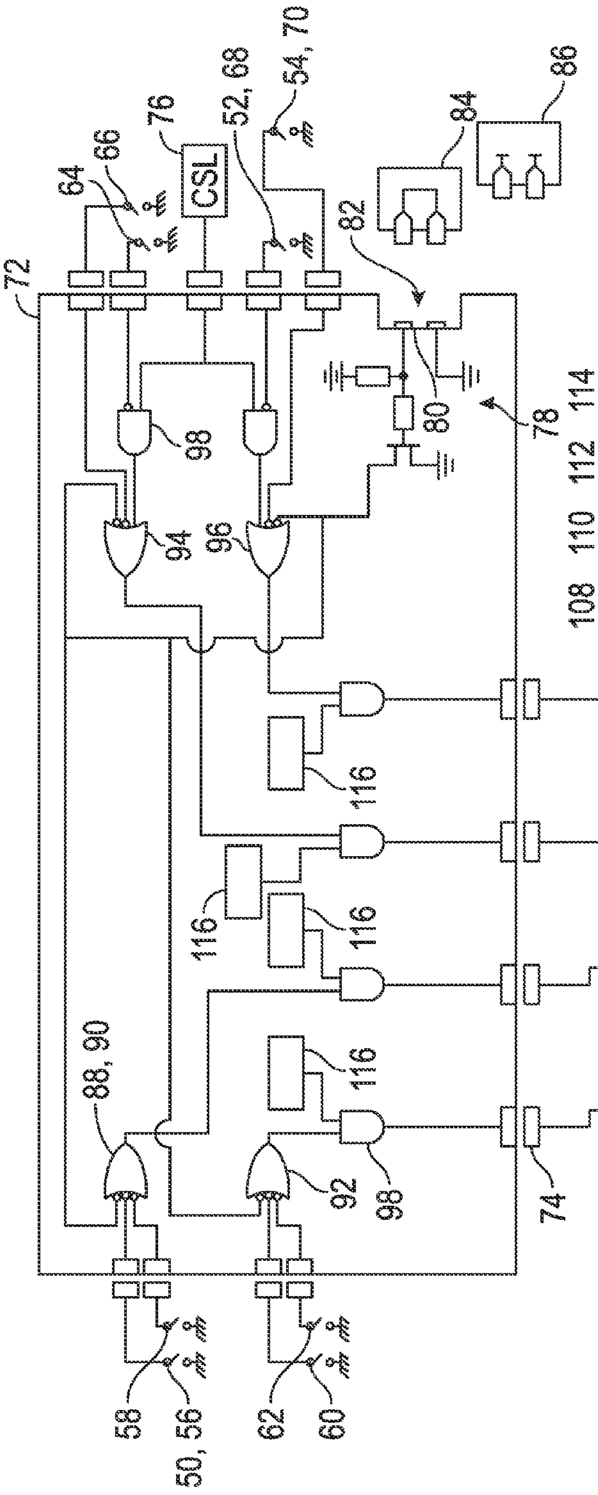
FIG. 4 is a schematic diagram of an electronic control unit and selected components of the latch motor system

With reference now to FIG. 4 and with continued reference to FIGS. 1 to 3, one embodiment of an ECU 72 is shown. An "H" bridge is a type of circuit that can be used to reverse the polarity of DC power to an electric component, such as a latch motor 34. The H bridge circuit has four gates that work in sets of two, so the voltage is applied in one of two different directions. In some embodiments, the H bridge can comprise a half bridge for several related components, combined with a common half bridge that completes the H bridge for each of the related components. Several half bridges are shown, which combine to make a complete H bridge circuit for each selected door 28. There is a left front half bridge 100, a right front half bridge 102, a right rear half bridge 104, a left rear half bridge 106, a theft security lock half bridge 108, a child security lock half bridge 110, a left common half bridge 112, and a right common half bridge 114.

The H bridge and the latch motors 34 are typically components of the vehicle 10, and the electronic control unit (ECU) 72 is a separate component. The H bridges and latch motors 34 are coupled to the doors 14, either directly or indirectly, and also comprise wiring and electrical contacts to make a connection with the ECU 72.

The ECU 72 includes logic 116 for controlling the electronic components of the latch or lock system, and can include interlock functionality to prevent certain operations. In various embodiments, the ECU 72 connects to the wiring for the latch motors 34, and also connects to the door handle sensors 50. Contacts 74 can be used at the connection point between the ECU 72 and the latch motors 34 and handle sensors 50. Many different types of contacts 74 can be used as long as an electrical connection is made. The ECU 72 can also be connected to other control devices or other components, such as a child security lock (CSL) 76 or a theft security lock 77, where the theft security lock 77 can be abbreviated "TSL."

The ECU 72 comprises a conversion loop 78 that is used to convert the ECU 72 from a first mode of operation to a second mode of operation, where the first and second modes of operation are different. The conversion loop 78 includes a receptacle circuit 80 that can be changed between an open circuit and a closed circuit. The receptacle circuit 80 is accessible via a receptacle 82, so the ECU 72 is designed with the receptacle 82 as a means to change the receptacle circuit 80. Changes to the receptacle circuit 80 change the mode of operation of the conversion loop 78, which changes the mode of operation of the ECU 72. Therefore, when the receptacle circuit 80 is changed between an open and closed state, the mode of operation of the ECU 72 also changes.

A wire harness 84 can be sized, shaped, and configured to fit into and engage the receptacle 82. The wire harness 84 can include contacts 74 and a physical wire that completes and closes the receptacle circuit 80, so when the receptacle 82 remains empty, the receptacle circuit 80 is open, and the receptacle circuit 80 is closed by simply installing the wire harness 84 in the receptacle 82. A wire harness 84 is a relatively simple and inexpensive component, so the wire harness 84 allows the user to determine the desired mode of operation, and set the ECU 72 to the proper mode of operation. The receptacle 82 can be set in a visible position, so a visual inspection can indicate if the wire harness 84 is present or not. This visual inspection can be used to verify the proper set-up of the ECU 72.

In an alternate embodiment, there can be the standard wire harness 84 to complete the receptacle circuit 80, and there can be a blank wire harness 86 that fills the receptacle but does not complete the receptacle circuit 80. There can be different colors, numbers, or other markings to differentiate the standard wire harness 84 from the blank wire harness 86, and the blank wire harness 86 can prevent dirt and debris from accumulating in the receptacle 82. In yet another embodiment, the receptacle circuit 80 can be a closed circuit when the receptacle 82 is empty, and the wire harness 84 can comprise a blade and insulator to sever the electrical connection so the receptacle circuit 80 becomes open when the wire harness 84 is present. Other embodiments are also possible.

The physical wire or other structure in the wire harness 84 makes a hard wired, structural change to the circuitry of the ECU 72, and more particularly the conversion loop 78, and even more particularly the receptacle circuit 80. This hard wired, structural change serves to make a stable, reproducible, and secure change to the mode of operation of the ECU 72, so more than a software or programming change is used to switch the ECU 72 between the first and second modes of operation. This provides additional security and reliability to the operation of the ECU 72.

The ECU 72 can be configured in a variety of ways, and one exemplary embodiment is shown. In this embodiment, the ECU 72 comprises a plurality of "or" gates 88, where an "or" gate 88 has a plurality of inputs and an output. If any of the inputs are accepted, the output is also accepted. For example, in a binary system, if any of the inputs were a "1", then the output would be a "1". Alternatively, if any of the inputs were a "yes", then the output would be a "yes". If none of the inputs were a "yes", then the output would be a "no". In this embodiment, the conversion loop 78 has an output that is an input for the "or" gates 88 associated with the selected door 28.

The ECU 72 shown has a right front "or" gate 90 which is used to control the right front door 16, and similar terminology is used to associate each "or" gate 88 with a selected door 28. The inputs to the right front "or" gate 90 are the right front inside handle sensor 56 and the right front outside handle sensor 58, as well as the output from the conversion loop 78. There is a left front "or" gate 92, and the inputs are the left front inside handle sensor 60 and the left front outside handle sensor 62, and the conversion loop output. The inputs to the right rear "or" gate 94 are the right rear inside handle sensor 64, the right rear outside handle sensor 66, and the conversion loop output, and the inputs to the left rear "or" gate 96 are the left rear inside handle sensor 68, the left rear outside handle sensor 70, and the conversion loop output. In some embodiments, there may not be an inside handle sensor 52, so only the outside handle sensors 54 are available. In other embodiments, the outside handle sensor 54 and/or the inside handle sensor 52 may be replaced by other sensors, such as radio signals or other inputs.

The output of the "or" gates 88 feeds to an "and" gate 98 for each selected door 28. The "and" gate 98 also receives a logic 116 input to determine operation of the electrical components, which in this case are the latch motors 34. The "and" gate 98 requires all the inputs to be accepted for an accepted output. For example, if each of the plurality of inputs to an "and" gate 98 are a "1" or a "yes", then the output will be a "1" or a "yes". However, if any of the plurality of inputs to the "and" gate 98 are a "0" or a "no", then the output will be a "0" or "no". The logic for what numeral represents an accepted input, or a yes input, can be varied. The "or" gates 88 are shown with an arc for the input side, and a point for the output side, and the "and" gates 98 are shown with a flat input side and a dome-shaped output side.

The output of the conversion loop 78 can be a "1" or a "yes" if the receptacle circuit 80 is open, so the ECU 72 can activate the latch motors 34 even if neither of the corresponding inside or outside handle sensors 52, 54 are activated. A "yes" output from the conversion loop 78 means one of the inputs to the "or" gates 88 is a yes, so there is no effective requirement that a handle sensor 50 is activated to operate the latch motor 34. The addition of the wire harness 84 closes the receptacle circuit, so the conversion loop 78 outputs a "0" or a "no" signal. In this mode, the ECU 72 prevents operation of the latch motors 34 unless at least one of the corresponding inside or outside handle sensors 52, 54 are activated. Therefore, the ECU 72 is properly configured to operate the door locks 30 when there is no wire harness 84 in the receptacle (or when the blank wire harness 86 is present), and the ECU 72 is properly configured to operate the door latches 32 (as opposed to door locks 30) when the wire harness 84 is inserted in the receptacle 82. The manufacturer determines which mode of operation is desired, and adjusts the ECU 72 accordingly by either inserting the wire harness 84 or leaving the receptacle 82 empty.

The ECU 72 can have additional functionality. For example, a child security lock (CSL) 76 can be added. The CSL 76 can use a separate ECU, or it can be incorporated into the door lock/latch ECU 72, or the CSL 76 can be other electronic components such as a simple switch. The CSL 76, when activated, prevents the rear doors 20, 22 from opening on activation of the inside handle sensors 52, so a child cannot open the door. In the illustrated embodiment, the CSL 76 operation uses a pair of "and" gates 98 in conjunction with the CSL controller for this function. In a similar, alternative embodiment, there can be a theft security lock 77 that prevents the opening of any selected doors 28 when the theft security lock 77 is enabled. The theft security lock 77 may be used with just the automatic locking system, just the automatic latching system, or both, as desired. The theft security lock 77 and CSL 76 wiring and components can be present in the vehicle 10 even if the controller or other components of the CSL 76 or theft security lock 77 are not present, in which case these security locks would never be activated. In alternate embodiments, the theft security lock 77 and/or the CSL 76 may be implemented in the ECU logic 116. In the embodiment shown, the CSL 76 and theft security locks 77 operate in the same manner for both the automatic locking mode and the automatic latching mode.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. An electronic control unit (ECU) for operation of a plurality of latch motors comprising:

a plurality of inputs configured to receive a connection from a plurality of handle sensors;

a plurality of outputs configured to connect to the plurality of latch motors; and a conversion loop with a receptacle and a receptacle circuit, where the receptacle circuit is accessible via the receptacle such that the receptacle circuit can be configured as either open or closed, where the ECU is configured such that the ECU operates in either a first mode or a second mode depending on whether the receptacle circuit is open or closed, and where the first mode is different than the second mode.

2. The ECU of claim 1 where activation of the latch motors requires activation of the handle sensor in one of the first and second modes, and where the latch motor can be activated without activation of the handle sensor in the other of the first and second modes.

3. The ECU of claim 1 further comprising a wire harness sized and shaped to engage the receptacle, and where the wire harness comprises a wire that closes the receptacle circuit when inserted into the receptacle.

4. The ECU of claim 1 where the receptacle circuit is configured to structurally switch between an open and closed circuit.

5. The ECU of claim 1 further comprising a plurality of "or" gates, where each "or" gate is connected to the conversion loop and where the ECU is configured for each "or" gate to connect to at least one handle sensor.

6. The ECU of claim 5 where the ECU comprises four "or" gates for the right front door, the left front door, the right rear door, and the left rear door, the ECU further comprising a child security lock "and" gate connected to the "or" gates for the left and right rear doors.

7. The ECU of claim 5 where the ECU is configured to accept an input from an inside handle and an outside handle for each of a right front door, a left front door, a right rear door, and a left rear door.

8. A motor vehicle comprising:

a plurality of doors comprising two or more selected doors, where each selected door comprises a handle sensor;

a latch motor associated with each selected door, where the latch motor drives one of (i) a lock or (ii) an unlatching mechanism, and where the unlatching mechanism utilizes the latch motor to latch and unlatch the selected door and the lock utilizes the latch motor to lock and unlock the selected door; and an electronic control unit (ECU) connected to the latch motors, where the ECU further comprises a conversion loop with a receptacle and a receptacle circuit, where the receptacle circuit is accessible via the receptacle such that the receptacle circuit can be set as either an open or a closed circuit, and where the conversion loop switches between a first mode and a second mode depending on whether the receptacle circuit is open or closed.

9. The motor vehicle of claim 8 where the conversion loop modifies the operation of the ECU such that, in one of the first and second modes, the latch motor can be activated without activation of the handle sensor, and in the other of the first and second modes, activation of the latch motor requires activation of the handle sensor.

10. The motor vehicle of claim 8 further comprising a wire harness sized and shaped to engage the receptacle, and where the wire harness makes a connection to change the receptacle circuit from an open circuit to a closed circuit.

11. The motor vehicle of claim 8 where the selected doors comprise a right front door, a left front door, a right rear door, and a left rear door, where the latch motor comprises a right front latch motor coupled to the right front door, a left front latch motor coupled to the left front door, a right rear latch motor coupled to the right rear door, and a left rear latch motor coupled to the left rear door, and where there handle sensor comprises an inside handle sensor and an outside handle sensor for each of the right front, left front, right rear, and left rear doors.

12. The motor vehicle of claim 11 further comprising a child security lock that interacts with the ECU, where activation of the child security lock prevents operation of the left and right rear latch motors upon activation of the inside left and right rear door handle sensors, respectively.

13. The motor vehicle of claim 11 further comprising a theft security lock that interacts with the ECU, where activation of the theft security lock prevents operation of the latch motors upon activation of the inside handle sensors.

14. The motor vehicle of claim 11 where the ECU further comprises (i) a right front "or" gate connected to the right front inside and outside sensors and the conversion loop, (ii) a left front "or" gate connected to the left front inside and outside handle sensors and the conversion loop, (iii) a right rear "or" gate connected to the right rear inside and outside handle sensors and the conversion loop, and (iv) a left rear "or" gate connected to the left rear inside and outside handle sensors and the conversion loop, such that each "or" gate allows operation if any of the conversion loop or the connected handle sensors is activated.

15. A method of modifying an electronic control unit (ECU) to operate vehicle latch motors comprising:

providing a vehicle with a plurality of selected doors, where each selected door comprises a latch motor and a handle sensor;

providing an electronic control unit (ECU) with outputs connected to the latch motors, where the ECU comprises a conversion loop with a receptacle circuit, where the receptacle circuit is accessible via a receptacle such that the receptacle circuit can be modified between an open circuit and a closed circuit, where the conversion loop operates in a first mode or a second mode depending on whether the receptacle circuit is open or closed, and where the logic the ECU utilizes to operate the latch motors is changed when the conversion loop switches between the first and second modes;

determining if activation of the latch motors should require activation of the handle sensor for the selected door, or if the latch motor can be activate without activation of the handle sensor for the selected door;

adjusting the ECU to operate in the required mode by setting the receptacle circuit as open or closed via the receptacle; and installing the ECU in the motor vehicle.

16. The method of claim 15 further comprising:

inserting a wire harness in the receptacle to set the conversion loop in the desired mode.

17. The method of claim 16 where the receptacle circuit is changed from an open circuit to a closed circuit by inserting the wire harness in the receptacle.

18. The method of claim 16 where the wire harness structurally changes the receptacle circuit upon insertion into the receptacle.

19. The method of claim 15 where the ECU comprises a plurality of "or" gates, and the handle sensors and the conversion loop are configured as inputs into the "or" gates.

20. The method of claim 19 where the ECU comprises a different "or" gate for each selected door.

21. The method of claim 19 where the handle sensors comprise an inside handle sensor and an outside handle sensor for each selected door, and the selected doors comprise a right front door, a left front door, a right rear door, and a left rear door.

* * * * *